(12) United States Patent
Lee et al.

(10) Patent No.: US 9,698,396 B2
(45) Date of Patent: Jul. 4, 2017

(54) SEPARATOR FOR SECONDARY BATTERY COMPRISING DUAL POROUS COATING LAYER OF INORGANIC PARTICLES WITH DIFFERENT SURFACE CHARACTERISTICS, SECONDARY BATTERY COMPRISING THE SAME, AND METHOD OF MANUFACTURING THE SEPARATOR

(71) Applicants: LG Chem, Ltd., Seoul (KR); Toray Battery Separator Film Co., Ltd., Tochigi (JP)

(72) Inventors: Joo-Sung Lee, Daejeon (KR); Dong-Wook Sung, Daejeon (KR); Kyung-Ryun Ka, Daejeon (KR); Jong-Hun Kim, Daejeon (KR)

(73) Assignees: LG Chem, Ltd. (KR); TORAY INDUSTRIES, INC. (JP)

( * ) Notice: Subject to any disclaimer, the term of this patent is extended or adjusted under 35 U.S.C. 154(b) by 225 days.

(21) Appl. No.: 14/330,037

(22) Filed: Jul. 14, 2014

(65) Prior Publication Data
US 2014/0322586 A1    Oct. 30, 2014

Related U.S. Application Data

(63) Continuation of application No. PCT/KR2013/011035, filed on Nov. 29, 2013.

(30) Foreign Application Priority Data

Nov. 30, 2012 (KR) .................. 10-2012-0138022
Nov. 29, 2013 (KR) .................. 10-2013-0147978

(51) Int. Cl.
*H01M 2/14* (2006.01)
*H01M 2/16* (2006.01)
*H01M 10/0525* (2010.01)

(52) U.S. Cl.
CPC .......... *H01M 2/145* (2013.01); *H01M 2/166* (2013.01); *H01M 2/1686* (2013.01);
(Continued)

(58) Field of Classification Search
CPC .................................................. H01M 2/1686
(Continued)

(56) References Cited

U.S. PATENT DOCUMENTS 7,655,360 B2    2/2010  Hennige et al.
2006/0141341 A1* 6/2006  Nishino .............. H01M 2/1653
                                                          429/62
(Continued)

FOREIGN PATENT DOCUMENTS

EP    2133387 A1    12/2009
JP    2009517810 A    4/2009
(Continued)

OTHER PUBLICATIONS

Extended Search Report from European Application No. 13857836.4, dated Feb. 29, 2016.
(Continued)

*Primary Examiner* — James Lee
(74) *Attorney, Agent, or Firm* — Lerner, David, Littenberg, Krumholz & Mentlik, LLP (57) ABSTRACT

The present disclosure relates to a separator for a secondary battery including a dual porous coating layer of inorganic particles with different surface characteristics, a secondary battery including the same, and a method of manufacturing the separator. According to an exemplary embodiment of the present disclosure, a separator including a porous substrate, a first porous coating layer, and a second porous coating layer is provided. According to the present disclosure, a method of manufacturing a separator including forming a first slurry, forming a second slurry, forming a first porous (Continued)

coating layer, and forming a second porous coating layer is provided. A separator according to the present disclosure has uniform dispersion of inorganic particles in a coating layer of the separator, and adsorbs an excess of metal ions generated in the battery when the battery is out of a normal operating temperature range, thereby ensuring safety of the battery.

7 Claims, 8 Drawing Sheets

(52) U.S. Cl.
CPC .... *H01M 10/0525* (2013.01); *H01M 2220/20* (2013.01); *H01M 2220/30* (2013.01)

(58) Field of Classification Search
USPC .......................................................... 429/144
See application file for complete search history.

(56) References Cited

U.S. PATENT DOCUMENTS

| | | | |
|---|---|---|---|
| 2007/0122716 A1 | 5/2007 | Seo et al. | |
| 2008/0102361 A1 | 5/2008 | Lee et al. | |
| 2008/0254369 A1 | 10/2008 | Inoue et al. | |
| 2008/0292968 A1 | 11/2008 | Lee et al. | |
| 2009/0181300 A1 | 7/2009 | Kim | |
| 2009/0325074 A1 | 12/2009 | Fukumoto et al. | |
| 2010/0248032 A1 | 9/2010 | Pitteloud et al. | |
| 2011/0059371 A1 | 3/2011 | Kamada et al. | |
| 2011/0206963 A1* | 8/2011 | Fujita .................. | H01M 2/1613 429/94 |

FOREIGN PATENT DOCUMENTS

| | | |
|---|---|---|
| JP | 2009518809 A | 5/2009 |
| JP | 2009170421 A | 7/2009 |
| KR | 20030094696 A | 12/2003 |
| KR | 20060033029 A | 4/2006 |
| KR | 20070019958 A | 2/2007 |
| KR | 20070083975 A | 8/2007 |
| KR | 20100084638 A | 7/2010 |
| KR | 20100120137 A | 11/2010 |
| WO | 2010081150 A1 | 7/2010 |
| WO | 2011029070 A1 | 3/2011 |

OTHER PUBLICATIONS

International Search Report for PCT/KR2013/011035 mailed Mar. 31, 2014.

* cited by examiner

SEPARATOR FOR SECONDARY BATTERY COMPRISING DUAL POROUS COATING LAYER OF INORGANIC PARTICLES WITH DIFFERENT SURFACE CHARACTERISTICS, SECONDARY BATTERY COMPRISING THE SAME, AND METHOD OF MANUFACTURING THE SEPARATOR

CROSS-REFERENCE TO RELATED APPLICATION

The present application is a continuation of International Application No. PCT/KR2013/011035 filed on Nov. 29, 2013, which claims priority to Korean Patent Application No. 10-2012-0138022 filed in the Republic of Korea on Nov. 30, 2012 and Korean Patent Application No. 10-2013-0147978 filed in the Republic of Korea on Nov. 29, 2013, the disclosures of which are incorporated herein by reference.

TECHNICAL FIELD

The present disclosure relates to a separator for a secondary battery including a porous coating layer, and more particularly, to a separator for a secondary battery including a dual porous coating layer of inorganic particles with different surface characteristics, a secondary battery including the same, and a method of manufacturing the separator.

BACKGROUND ART

Recently, there has been growing interest in energy storage technologies. As the application fields of energy storage technologies have been extended to mobile phones, camcorders, lap-top computers, and even electric cars, development of a rechargeable secondary battery, in particular, a lithium secondary battery is the focus of particular interest.

However, a porous separator of a secondary battery shows severe thermal shrinkage behaviors at a temperature of 100° C. or higher in view of its material properties and features of a manufacturing process including stretching, causing a short circuit between a cathode and an anode. To address a safety issue of a battery, for example, Korean Patent Publication No. 2007-0083975 (Hitachi) and Korean Patent Publication No. 2007-0019958 (Evonik) disclose a separator in which a porous coating layer formed from a mixture of insulating filler particles and a binder polymer is provided on a porous substrate and a material having a shut-down function is added to the porous coating layer.

However, when a secondary battery is, for example, overcharged, a transition ion (metal ion) in excess is released from a cathode and inserted into an anode, so that the transition ion having high reactivity is deposited on the anode surface and the cathode becomes thermally unstable. Moreover, the battery still has unresolved safety concerns such as overheat, fire, or explosion due to drastic heat generation caused by a decomposition reaction of an organic solvent used as an electrolyte solution. Accordingly, there is a need for a new coating layer having a function of removing excess metal ions that become problematic with safety.

Also, there is still a demand for a separator for a secondary battery in which a pore structure is well maintained in each of a porous coating layer having inorganic particles and a separator in contact with the porous coating layer and a transition ion can be favorably moved between the porous coating layer and the separator by the pore structure.

DISCLOSURE

Technical Problem

Accordingly, the present disclosure is directed to providing a separator for a secondary battery having a new porous coating layer in which inorganic particles are uniformly dispersed in a slurry during a manufacturing process to facilitate the manufacture and enable the coating layer formed finally to adsorb a metal ion well.

Technical Solution

To achieve the above object, according to an aspect of the present disclosure, there is provided a separator for a secondary battery including a porous substrate having a pore, a first porous coating layer formed by coating on at least one area among at least one surface and the pore of the porous substrate, and including first inorganic particles having a Brunauer, Emmett & Teller (BET) surface area less than or equal to 10 $m^2/g$ and a first binder polymer disposed in a part or all of the first inorganic particles to couple and bond the first inorganic particles to one another, and a second porous coating layer formed by coating on the first porous coating layer, and including second inorganic particles having a BET surface area in a range of 10 to 50 $m^2/g$, an average pore size in a range of 2 to 200 nm and an average particle diameter in a range of 0.1 μm to 10 μm, and a second binder polymer disposed in a part or all of the second inorganic particles to couple and bond the second inorganic particles to one another.

According to an aspect of the present disclosure, there is provided a method of manufacturing a separator for a secondary battery including forming a first slurry in which first inorganic particles are dispersed, by adding the first inorganic particles having a BET surface area less than or equal to 10 $m^2/g$ to a first binder solution in which a first binder polymer is dissolved in a first solvent, followed by agitation, forming a second slurry in which second inorganic particles are dispersed, by adding the second inorganic particles having a BET surface area in a range of 10 to 50 $m^2/g$, an average pore size in a range of 2 to 200 nm, and an average particle diameter in a range of 0.1 μm to 10 μm to a second binder solution in which a second binder polymer is dissolved in a second solvent, followed by agitation, forming a first porous coating layer on at least one area among at least one surface and a pore of a porous substrate by applying and drying the first slurry to the at least one surface of the porous substrate having the pore, and forming a second porous coating layer on the first porous coating layer by applying and drying the second slurry to the first porous coating layer.

These and other objects and aspects of the present disclosure can be understood by the following description, and will become apparent from the embodiments of the present disclosure. Also, it should be understood that these and other objects and aspects of the present disclosure may be achieved by any means in the scope of the disclosure and combinations thereof.

Advantageous Effects

A separator according to an aspect of the present disclosure may maintain a pore structure well due to uniform dispersion of inorganic particles in a coating layer of the separator and adsorb an excess of metal ions generated in a battery when the battery is out of a normal operating temperature range, thereby ensuring safety of the battery.

DESCRIPTION OF DRAWINGS

The accompanying drawing illustrates a preferred embodiment of the present disclosure and together with the foregoing disclosure, serves to provide further understanding of the technical spirit of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

According to an aspect of the present disclosure, a separator for a secondary battery including a porous substrate having a pore, a first porous coating layer, and a second porous coating layer is provided.

Non-limiting examples of the porous substrate may be a polymer membrane, a multi-layered polymer membrane, or a woven or non-woven fabric formed from any one polymer selected from the group consisting of polyethylene, polypropylene, polyethyleneterephthalate, polybutyleneterephthalate, polyester, polyacetal, polyamide, polycarbonate, polyimide, polyetheretherketone, polyaryletherketone, polyetherimide, polyamideimide, polybenzimidazole, polyethersulfone, polyphenyleneoxide, cyclic olefin copolymer, polyphenylenesulfide and polyethylenenaphthalene, or mixtures thereof. In the presence of the porous substrate, insulation between both electrodes is maintained. A type, a thickness, a pore size, and a number of pores of the porous substrate, and particularly, in a case of a non-woven fabric, a thickness of a superfine fiber, may be adjusted in consideration of a melting temperature, easiness to manufacture, a porosity, ion movement, insulation, and the like.

The first porous coating layer is formed by coating on at least one area among at least one surface and the pore of the porous substrate, and includes first inorganic particles and a binder polymer. The binder polymer is disposed in a part or all of the first inorganic particles and functions to couple and bond the first inorganic particles to one another.

The second porous coating layer is formed by coating on the first porous coating layer, and includes second inorganic particles and a binder polymer. The binder polymer is disposed in a part or all of the second inorganic particles and functions to couple and bond the second inorganic particles to one another.

A non-limiting example of the binder polymer may include any one selected from the group consisting of polyvinylidene fluoride-co-hexafluoro propylene (PVDF-co-HFP), polyvinylidene fluoride-co-trichloro ethylene, polyvinylidene fluoride-co-chlorotrifluoro ethylene, polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethyl cellulose, cyanoethyl sucrose, pullulan, carboxyl methyl cellulose (CMC), acrylonitrile-styrene-butadiene copolymer, polyimide, polyvinylidene fluoride, polyacrylonitrile and styrene butadiene rubber (SBR), or mixtures thereof.

As each of the first inorganic particles and the second inorganic particles, an inorganic particle having a dielectric constant greater than or equal to 5 and an inorganic particle having a lithium ion delivery capability (in a case of a lithium secondary battery), singularly or in combination, may be independently used. The inorganic particle having a dielectric constant greater than or equal to 5 may be any one selected from the group consisting of $BaTiO_3$, $Pb(Zr_x,Ti_{1-x})O_3$ (PZT, $0<x<1$), $Pb_{1-x}La_xZr_{1-y}Ti_yO_3$ (PLZT, $0<x<1$, $0<y<1$), $(1-x)Pb(Mg_{1/3}Nb_{2/3})O_3-xPbTiO_3$ (PMN-PT, $0<x<1$), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$, or mixtures thereof. The inorganic particle having a lithium ion delivery capability may be, as a non-limiting example, any one selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2(Li_xSi_yS_z$, $0<x<3$, $0<y<2$, $0<z<4$)-based glass and $P_2S_5(Li_xP_yS_z$, $0<x<3$, $0<y<3$, $0<z<7$)-based glass, or mixtures thereof.

Figure 1:
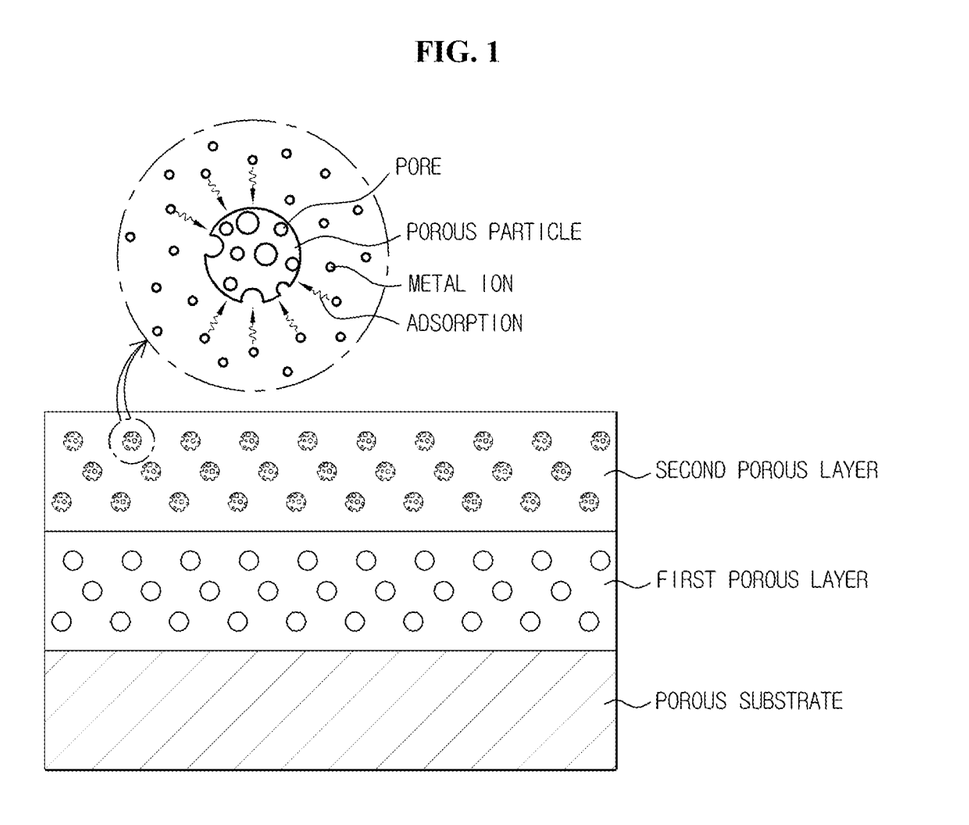
FIG. 1 illustrates a separator for a secondary battery manufactured according to an exemplary embodiment of the present disclosure.

FIG. 1 illustrates a separator for a secondary battery manufactured according to an exemplary embodiment of the present disclosure, and accordingly, the present disclosure is not limited thereto. Referring to FIG. 1, a detailed description is as follows.

The first inorganic particles correspond to a less porous or non-porous (solid) inorganic particle. The first inorganic particles have a Brunauer, Emmett & Teller (BET) surface area less than or equal to about 10 $m^2/g$, and have little adsorption function dissimilar to the second inorganic particles or has a weak adsorption function, if any, however they are dispersed well in a slurry when forming a coating layer, and thus may be uniformly dispersed in a final porous coating layer.

The second inorganic particles correspond to a relatively more porous inorganic particle when compared to the first inorganic particles. The second inorganic particles have a BET surface area in a range of about 10 to about 50 $m^2/g$, or in a range of about 12 to about 30 $m^2/g$. Also, an average pore size of the second inorganic particles may be in a range of about 2 to about 200 nm or in a range of about 5 to about 100 nm. In the second inorganic particles, when its BET surface area is less than the above range, it is difficult to implement an expected effect of the present disclosure, that is, a metal ion adsorption effect, and to improve dispersibility, a dispersant should be inputted in excess, which may exert a bad influence on the performance of a final product, that is, a battery. Meanwhile, when the average pore size is less than the above range, there is a shortcoming that a specific surface area increases dramatically, and when the average pore size exceeds 200 nm, the pore size becomes similar to a particle size and thereby a porosity effect expected from the present disclosure is greatly reduced.

The metal ion corresponds to a metal ion released from a cathode or a cathode active material in an abnormal situation of the battery or even in a normal situation, and may be, for example, manganese (Mn), cobalt (Co), nickel (Ni), iron (Fe), and the like, based on a material for a cathode active material used. The metal ion may be adsorbed by, for example, electrical attraction, capillarity, and the like, within the pores of the second inorganic particles.

By the distribution of the first inorganic particles and the second inorganic particles independently in each porous coating layer, each of the inorganic particles may show its unique characteristics respectively.

For example, the first porous coating layer containing the first inorganic particles in the coating layer may include the inorganic particles dispersed uniformly in the coating layer by use of a relatively small amount of solvent (dispersion medium) or dispersant due to unique dispersibility of the first inorganic particles. Also since the first porous coating uses a small amount of solvent or dispersant, the state of pores at an interface between the porous substrate and the first porous coating layer are excellently maintained. Accordingly, ionic conductivity and impregnation property with an electrolyte is greatly improved. Meanwhile, the second porous coating layer containing the second inorganic particles in the coating layer shows excellent performance in removing the metal ion in the separator due to a unique adsorption capability caused by greater porous properties of the second inorganic particles.

Each of the first inorganic particles and the second inorganic particles may have, independently, an average particle diameter in a range of about 0.01 to about 10 μm or in a range of about 0.1 to about 5 μm. When the average particle diameter of the inorganic particles falls within the above range, a reduction in dispersibility of the inorganic particles in the coating layer may be prevented or minimized, and the thickness and porosity of each of the porous coating layers may be properly adjusted.

Figure 2:
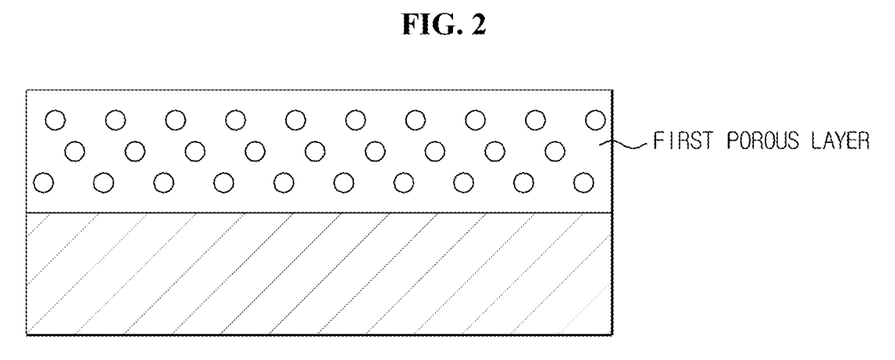
FIG. 2 is a view schematically illustrating a dispersed state of inorganic particles in a slurry in case only a first inorganic particle is used.
Figure 3:
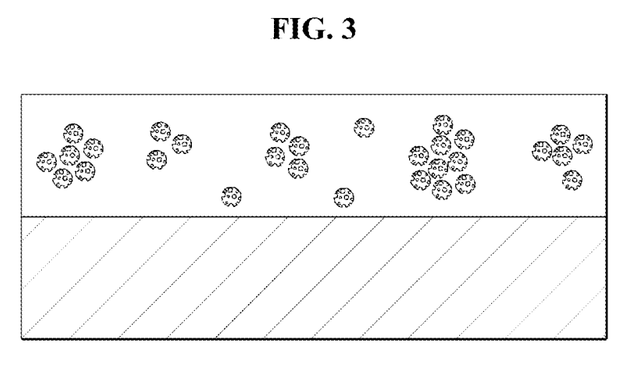
FIG. 3 is a view schematically illustrating a dispersed state of inorganic particles in a slurry in case only a second inorganic particle is used.
Figure 4:
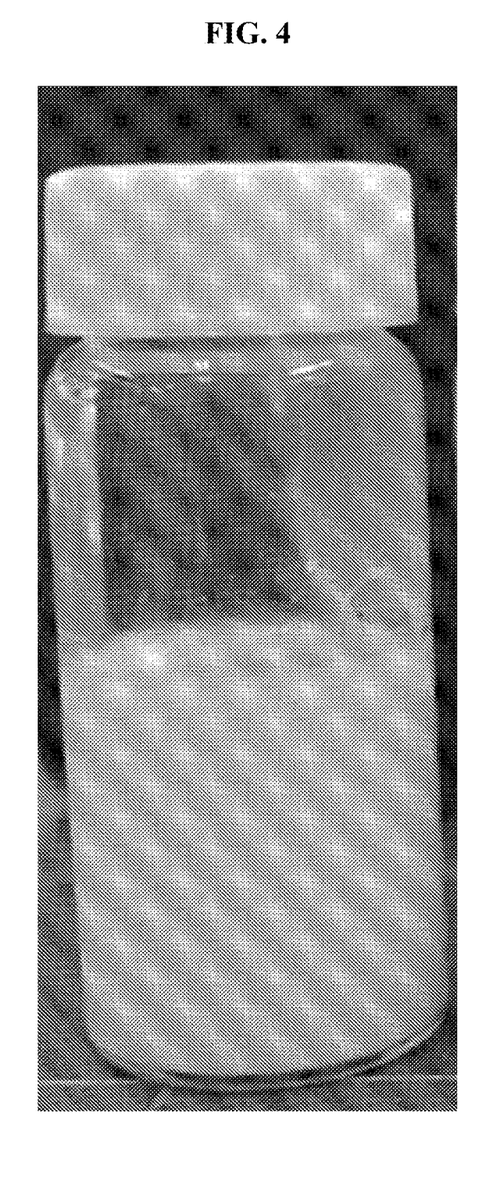
FIG. 4 illustrates a slurry in case only a first inorganic particle is used in process of manufacturing a separator according to Embodiment example 1.
Figure 5:
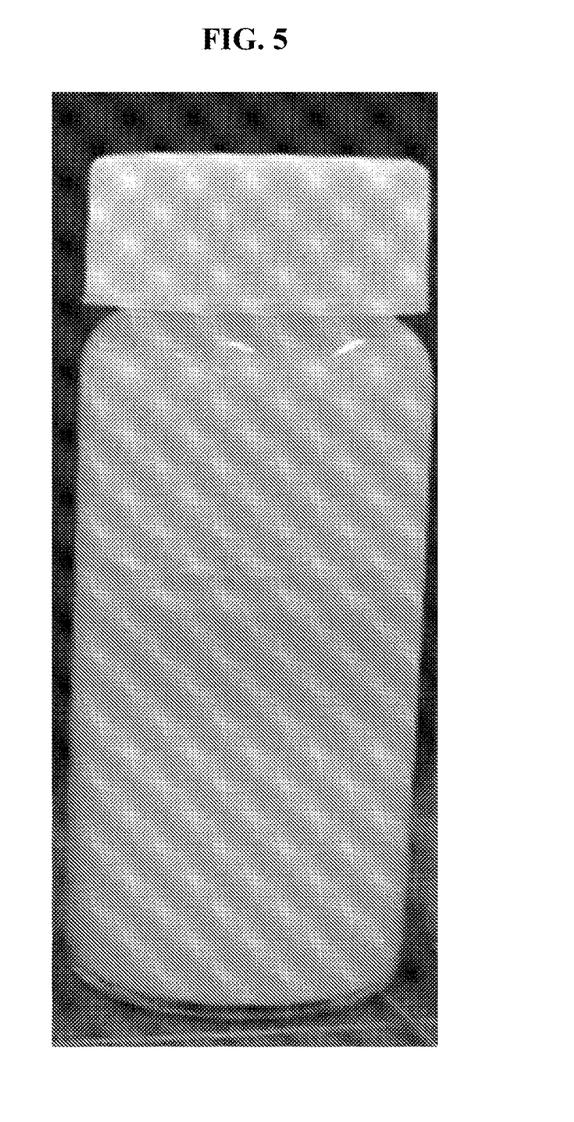
FIG. 5 illustrates a slurry in case only a second inorganic particle is used in process of manufacturing a separator according to Embodiment example 1.

In the step of forming each porous coating layer, to provide a comparison of a dispersed state of inorganic particles in a slurry using various types of inorganic particles, a slurry including only the first inorganic particles and a slurry including only the second inorganic particles are shown in FIGS. 2 and 3, respectively, and photographic images of the slurries are shown in FIGS. 4 and 5, respectively.

FIGS. 2 and 4 illustrate a dispersed state of inorganic particles in a slurry in case only a first inorganic particle is used in a process of manufacturing a separator, and a photographic image of the slurry, respectively. The first inorganic particles may be dispersed well and uniformly distributed in a final coating layer, dissimilar to the second inorganic particles. However, a separator having a final porous coating layer formed as described in the foregoing is difficult to sufficiently expect a function of adsorbing and removing a metal ion, for example, a metal ion released abnormally due to surface properties of less porous or non-porous inorganic particles.

FIGS. 3 and 5 illustrate a dispersed state of inorganic particles in a slurry in case only a second inorganic particle is used in a process of manufacturing a separator, and a photographic image of the slurry, respectively. In case only a second inorganic particle is used, a dispersed state of inorganic particles in a slurry (binder solution) is poor because the inorganic particles agglomerate together due to unique characteristics of the second inorganic particles, for example, a plurality of pores present therein, but a function of adsorbing and removing a metal ion released abnormally is sufficiently expected.

The content of the first inorganic particles may be in a range of about 70 to about 99 wt % or in a range of about 80 to about 95 wt % of the first porous coating layer. When the first inorganic particles are included in the first porous coating layer within the above range, the first inorganic particles may be uniformly dispersed by use of a small amount of solvent or dispersant in the process of manufacturing the first porous coating layer, and besides, the first porous coating layer may form an assembly having excellent ionic conductivity and electrolyte impregnation together with the porous substrate underlying in contact therewith.

Also, the content of the second inorganic particles may be in a range of about 30 to about 95 wt % or in a range of about 50 to about 90 wt % of the second porous coating layer. When the second inorganic particles are included in the second porous coating layer within the above range, the second inorganic particles may have a great improvement in adsorption and removal of a metal ion generated in the battery due to their unique characteristics, that is, adsorption in the second porous coating layer.

Figure 6:
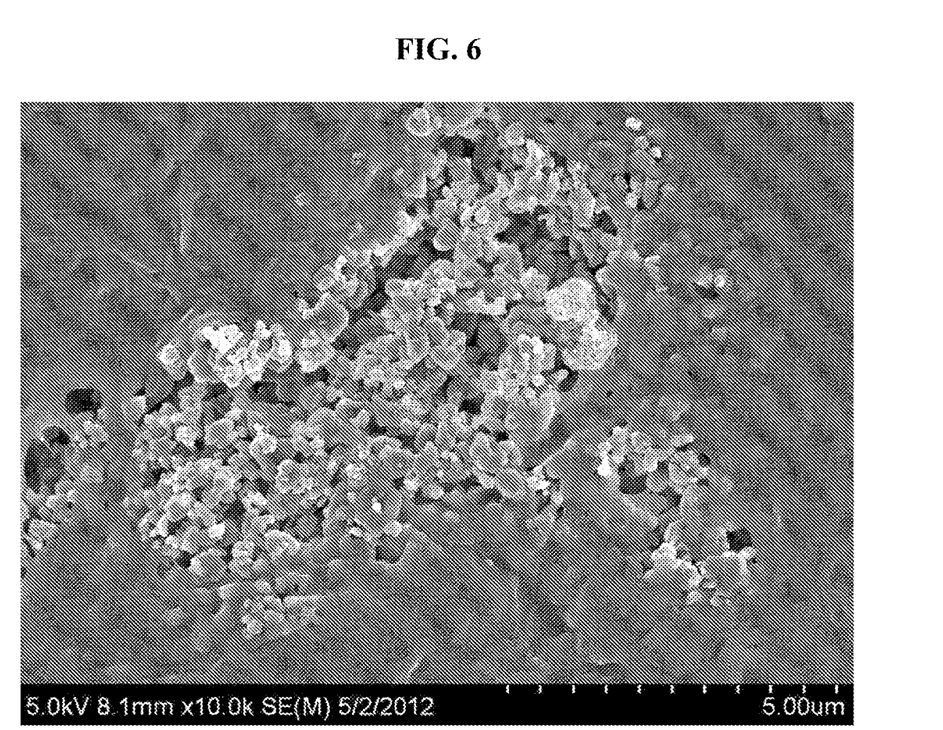
FIGS. 6 and 7 are microscope photographic images of a surface observed after coating each slurry implemented according to FIGS. 4 and 5 on a polyolefin substrate.
Figure 7:
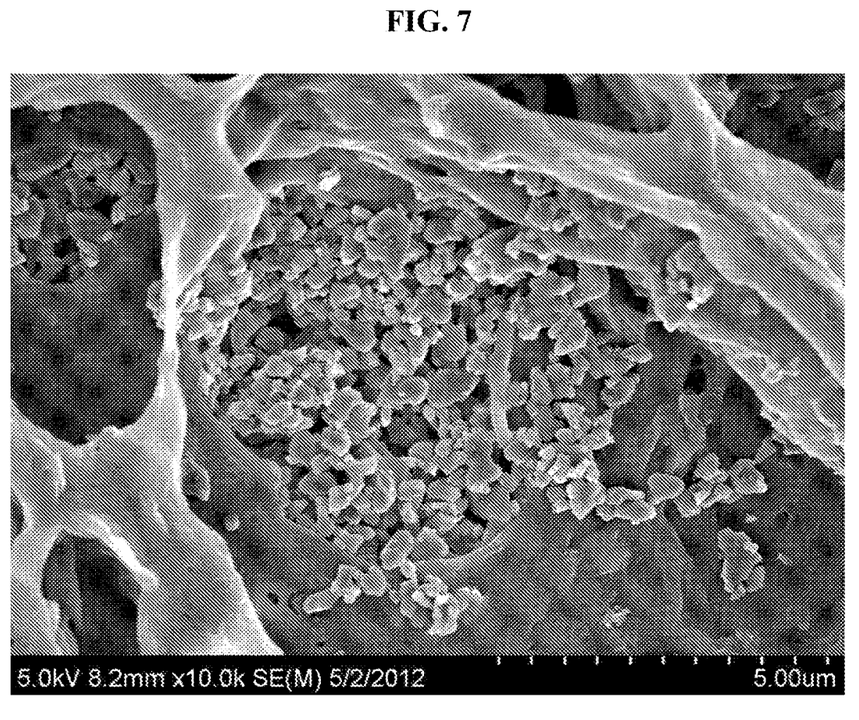

FIGS. 6 and 7 are microscope photographic images of a surface observed after coating each slurry implemented according to FIGS. 4 and 5 on a polyolefin substrate. Referring to these photographic images, a dispersed state of inorganic particles in a slurry in the step of forming a coating layer as described in the foregoing may be verified directly.

There is no particular limitation on a pore size and porosity in a porous coating layer, but a preferred pore size is in a range of about 0.001 to about 10 μm and a preferred porosity is in a range of about 10 to about 90%. The pore size and porosity is primarily dependent on a size of inorganic particles, and for example, when inorganic particles having a particle diameter less than or equal to about 1 μm are used, a pore formed thereby also has a pore size less than or equal to about 1 μm. This pore structure is filled with an electrolyte solution to be injected later, and the filled electrolyte solution functions to transfer an ion. When the pore size and the porosity are less than about 0.001 μm and about 10%, respectively, the porous coating layer may serve as a resistance layer, and when the pore size and the porosity exceed about 10 μm and about 90%, respectively, mechanical properties may deteriorate. Preferably, a load amount of the porous coating layer for the porous substrate is in a range of about 5 to about 20 $g/m^2$ based on the porous substrate when considering a function of the porous coating layer and suitability for a high capacity battery.

According to another aspect of the present invention, a secondary battery including a cathode, an anode, and the above-described separator between the cathode and the anode is provided. Also, the secondary battery may correspond to a lithium secondary battery.

The cathode, the anode, and the like are well known in the art, or may be easily manufactured by a process and/or method known in the art.

The cathode is manufactured in a way of binding a cathode active material to a cathode current collector by a general method known in the art. In this instance, as the cathode active material, a conventional cathode active material usable in a cathode of a conventional electrochemical device may be used, and a non-limiting example of the cathode active material may include $LiCoO_2$, $LiNiO_2$, $LiMnO_2$, $LiMn_2O_4$, $Li(Ni_aCo_bMn_c)O_2$ (0<a<1, 0<b<1, a+b+c=1), $LiNi_{1-Y}Co_YO_2$, $LiCo_{1-Y}Mn_YO_2$, $LiNi_{1-Y}Mn_YO_2$ (0≤Y<1), $Li(Ni_aCo_bMn_c)O_4$ (0<a<2, 0<b<2, a+b+c=2), $LiMn_{2-Z}Ni_ZO_4$, $LiMn_{2-Z}Co_ZO_4$ (0<Z<2), $LiCoPO_4$, $LiFePO_4$, and mixtures thereof. Also, as the cathode current collector, a foil made from aluminum, nickel, or a combination thereof, may be used.

The anode is manufactured in a way of binding an anode active material to an anode current collector by a general method known in the art. In this instance, as the anode active material, for example, carbon such as non-graphitizable carbon and graphite-based carbon; metal composite oxide such as $Li_xFe_2O_3$ (0≤x≤1), $Li_xWO_2$ (0≤x≤1), and $Sn_xMe_{1-x}Me'_yO_z$ (Me: Mn, Fe, Pb, Ge; Me': Al, B, P, Si, elements of Groups 1, 2, and 3 in the periodic table, halogen; 0<x≤1; 1≤y≤3; 1≤z≤8); lithium metals; lithium alloys; silicon-based alloys; tin-based alloys; oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; Li—Co—Ni-based materials, and the like, may be used. Meanwhile, as the anode current collector, stainless steel, nickel, copper, titanium, or alloys thereof, may be used.

Also, an electrolyte that may be inserted between the electrode and the separator may include a salt, for example, of $A^+B^-$ structure, where $A^+$ represents an ion including an alkali metal cation such as $Li^+$, $Na^+$ and $K^+$, or combinations thereof, and $B^-$ represents an ion including an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$, or combinations thereof, and such a salt may be dissolved or dissociated in an organic solvent including, but is not limited to, propylene carbonate (PC), ethylene carbonate (EC), diethyl carbonate (DEC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethylmethylcarbonate (EMC), gamma butyrolactone (γ-butyrolactone), or mixtures thereof.

Injection of the electrolyte may be performed in a proper step among a battery fabrication process based on a manufacturing process and required physical properties of a final product. As a process of applying the separator of the present disclosure to a battery, besides a winding process generally used, a lamination/stacking and folding process of a separator and an electrode may be contemplated.

Figure 8:
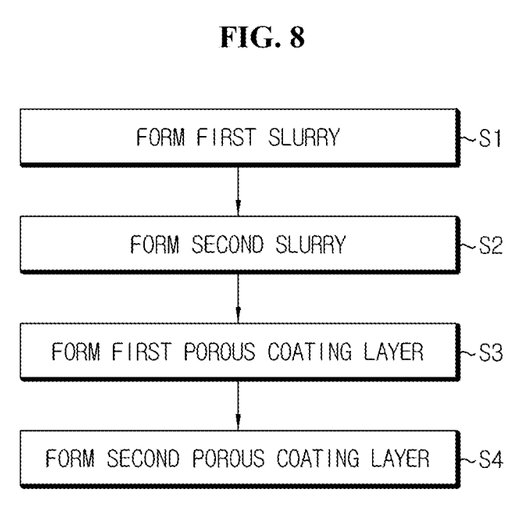
FIG. 8 is a diagram schematically illustrating a process of manufacturing a separator according to an exemplary embodiment of the present disclosure.

FIG. 8 is a diagram schematically illustrating a process of manufacturing a separator according to an exemplary embodiment of the present disclosure. According to another aspect of the present disclosure, there is provided a method of manufacturing a separator for a secondary battery including (S1) forming a first slurry, (S2) forming a second slurry, (S3) forming a first porous coating layer, (S4) forming a second porous coating layer. Hereinafter, a detailed description is provided with reference to FIG. 8.

In S1, first, a first binder solution (or coating solution) is provided by dissolving a first binder polymer in a first solvent.

The first binder polymer may be the same as described in the foregoing in the description of the separator for the secondary battery according to the present disclosure.

The first solvent preferably has a similar solubility parameter to that of a binder polymer intended to use, and has a low melting point. This may allow uniform mixing and ease the subsequent removal of the first solvent. A non-limiting example of the first solvent may include any one selected from the group consisting of acetone, tetrahydrofuran, methylene chloride, chloroform, dimethylformamide, N-methyl-2-pyrrolidone (NMP) and cyclohexane, or mixtures thereof.

A first slurry in which first inorganic particles are dispersed is formed by adding the first inorganic particles to the first binder solution. The first inorganic particles may be the same as described in the foregoing in the description of the separator for the secondary battery according to the present disclosure.

The content of the first solvent may be in a range of about 40 to about 95 wt % or in a range of about 60 to about 90 wt % of the first slurry. The content of the first solvent within the range may help in maintaining a pore structure of a porous substrate while ensuring wettability of the first slurry on the porous substrate during subsequent coating.

In S2, a second binder solution (or coating solution) is provided by dissolving a second binder polymer in a second solvent.

Each of the second binder polymer and the second solvent may be, independently, identical to or different from the first binder polymer and the first solvent. A second slurry in which second inorganic particles are dispersed is formed by adding the second inorganic particles to the second binder solution. The second inorganic particles may be the same as described in the foregoing in the description of the separator for the secondary battery according to the present disclosure.

The content of the second solvent may be in a range of about 40 to about 95 wt % or in a range of about 60 to about 90 wt % of the second slurry. The content of the second solvent within the range may prevent mixing of first and second porous coating layers to be formed until subsequent drying, allowing a stable interface state.

In S3, the first slurry formed in S1 is applied to at least one surface of the porous substrate. Subsequently, the first solvent is removed from the first slurry by drying the first slurry-applied porous substrate. Due to the removal of the first solvent, a first coating layer is formed in at least one area among the at least one surface and the pore of the porous substrate.

The porous substrate may be the same as described in the foregoing in the description of the separator according to the present disclosure, and the porous substrate may be manufactured by forming a pore through a conventional method known in the art, for example, a wet method using a solvent, a diluent or a pore forming agent, or a dry method using a stretching method, to ensure excellent permeability and porosity from the substrate material described in the foregoing.

A method of coating the first slurry in which the first inorganic particles are dispersed onto the porous substrate may use a conventional coating method known in the art, and various methods may be used, for example, dip coating, die coating, roll coating, comma coating, or combinations thereof. Also, the first porous coating layer may be selectively formed on either one or both surfaces of the porous substrate. The first porous coating layer formed by this coating method may, in part, exist inside the porous substrate due to characteristics of the porous substrate, as well as on the surface of the porous substrate.

In S4, the second slurry formed in S2 is applied onto the first porous coating layer formed in S3. Subsequently, the second solvent is removed from the second slurry by drying the second slurry-applied porous coating layer, and thereby the second porous coating layer is formed on the first porous coating layer.

A method of coating the second slurry in which the second inorganic particles are dispersed onto the first porous coating layer may use a conventional coating method known in the art as well as various methods as described in the foregoing in the description of applying of the first porous coating layer.

Also, besides the above-described separator, the cathode, the anode, and the electrolyte solution may be the same as well known in the art, and these may be commercially available or easily manufactured by a process and/or method known in the art.

A secondary battery is manufactured by interposing the separator of the present disclosure between the cathode and the anode. Also, the secondary battery of the present disclosure may be a lithium secondary battery including a lithium metal secondary battery, a lithium ion secondary battery, a lithium polymer secondary battery, a lithium ion polymer secondary battery, and the like.

Hereinafter, embodiments of the present disclosure will be described in detail. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

Embodiment Example 1

Manufacture of Separator

A first binder solution was prepared by adding 5 parts by weight of polyvinylidenefluoride chlorotrifluoroethylene copolymer (PVdF-CTFE) as a first binder to 95 parts by weight of acetone as a first solvent, and dissolving at 50° C. for about 12 hours or longer.

A first slurry was prepared by mixing and dispersing, in the prepared first binder solution, first alumina particles having an average particle diameter of 0.7 μm and a BET surface area of 4 m$^2$/g at a binder:inorganic matter ratio of 10:90. The dispersibility of the first slurry is the same as illustrated in FIG. 4.

A second binder solution was prepared by adding 5 parts by weight of polyvinylidenefluoride chlorotrifluoroethylene copolymer (PVdF-CTFE) as a second binder to 95 parts by weight of acetone as a second solvent, and dissolving at 50° C. for about 12 hours or longer.

A second slurry was prepared by mixing and dispersing, in the prepared second binder solution, second alumina particles having an average particle diameter of 0.4 μm, a BET surface area of 15 m$^2$/g, and an average pore size of 100 nm at a binder:inorganic matter ratio of 20:80. The dispersibility of the second slurry is the same as illustrated in FIG. 5.

A first porous coating layer and a second porous coating layer were formed concurrently by coating the prepared first slurry and second slurry on a polyethylene porous substrate (Celgard, PP1615) having a thickness of 16 μm in a sequential order by a double-layer slide-slot coating method. The thicknesses of each coating layer were adjusted to about 5 urn and about 3 μm.

Manufacture of Cathode

A cathode active material slurry was prepared by adding, to 40 parts by weight of N-methyl-2-pyrrolidone (NMP) as a solvent, 90 parts by weight of lithium manganese composite oxide as a cathode active material, 5 parts by weight of carbon black as a conductive material, and 5 parts by weight of polyvinylidenefluoride (PVDF) as a binder. A cathode was manufactured by applying the cathode active material slurry to a 100 μm thick aluminum (Al) thin film of a cathode current collector and drying, and by compressing with a roll press.

Manufacture of Anode

An anode active material slurry was prepared by adding, to 100 parts by weight of N-methyl-2-pyrrolidone (NMP) as a solvent, 95 parts by weight of carbon powder as an anode active material, 3 parts by weight of carbon black as a conductive material, and 2 parts by weight of polyvinylidenefluoride (PVDF) as a binder. An anode was manufactured by applying the anode active material slurry to a 90 μm thick copper (Cu) thin film of an anode current collector and drying, and by compressing with a roll press.

Manufacture of Lithium Secondary Battery

Unit cells were assembled together by stacking the manufactured separator, cathode, and anode. Subsequently, a lithium secondary battery was manufactured by injecting an electrolyte solution (ethylene carbonate (EC)/dimethyl carbonate (DMC)/ethylmethylcarbonate (EMC)=3/4/3 (volumetric ratio), 1M lithium hexyfluorophosphate (LiPF$_6$)).

Comparative Example 1

A separator was manufactured by the same method of Embodiment example 1, except that only a first porous coating layer including first alumina particles was formed without a second porous coating layer including second alumina particles in a process of manufacturing a separator. Also, a lithium secondary battery was manufactured using the separator by the same method as Embodiment example 1.

Comparative Example 2

A separator was manufactured by the same method of Embodiment example 1, except that only a second porous coating layer including second alumina particles was formed without a first porous coating layer including first alumina particles in a process of manufacturing a separator. Also, a lithium secondary battery was manufactured using the separator by the same method as Embodiment example 1. However, an excessive binder content degrades permeability of the separator, resulting in a remarkable reduction in a lithium ion delivery capability.

Experimental Example 1

Evaluation of Physical Properties of Separator

En the secondary batteries manufactured in Embodiment example 1 and Comparative example 1, an activation process was performed after injecting an electrolyte solution, and a capacity fade ratio of the secondary batteries was measured. The result was shown in Table 1.

TABLE 1

|  | Initial | 100 cycles | 200 cycles | 300 cycles |
|---|---|---|---|---|
| Embodiment example 1 | 100% | 99.6% | 98.8% | 97.6% |
| Comparative example 1 | 100% | 98.0% | 95.2% | 92.6% |

Also, the batteries were disassembled, and for the anode surface, a detected amount of manganese ions was examined using inductively coupled plasma (ICP). The result was shown in Table 2.

TABLE 2

|  | Separator surface (ppm) | Anode surface (ppm) |
|---|---|---|
| Embodiment example 1 | 145 | 150 |
| Comparative example 1 | 135 | 180 |

What is claimed is:

1. A separator for a secondary battery, comprising:
   a porous substrate having a pore;
   a first porous coating layer formed by coating on at least one area among at least one surface and the pore of the porous substrate, and including first inorganic particles having a Brunauer, Emmett & Teller (BET) surface area less than 10 $m^2/g$ and a first binder polymer disposed in a part or all of the first inorganic particles to couple and bond the first inorganic particles to one another; and
   a second porous coating layer formed by coating on the first porous coating layer, and including second inorganic particles having a BET surface area in a range of 10 to 50 $m^2/g$ and a second binder polymer disposed in a part or all of the second inorganic particles to couple and bond the second inorganic particles to one another,
   wherein the second inorganic particles have an average pore size in a range of 2 to 200 nm, and an average particle diameter in a range of 0.1 μm to 10 μm.

2. The separator according to claim 1, wherein a content of the first inorganic particles is in a range of 70 to 99 wt % of the first porous coating layer.

3. The separator according to claim 1, wherein a content of the second inorganic particles is in a range of 30 to 95 wt % of the second porous coating layer.

4. The separator according to claim 1, wherein the porous substrate is a polymer membrane, a multi-layered polymer membrane, or a woven or non-woven fabric formed from any one polymer selected from the group consisting of polyethylene, polypropylene, polyethyleneterephthalate, polybutyleneterephthalate, polyester, polyacetal, polyamide, polycarbonate, polyimide, polyetheretherketone, polyaryletherketone, polyetherimide, polyamideimide, polybenzimidazole, polyethersulfone, polyphenyleneoxide, cyclic olefin copolymer, polyphenylenesulfide, and polyethylenenaphthalene, or mixtures thereof.

5. The separator according to claim 1, wherein each of the first binder polymer and the second binder polymer is, independently, any one selected from the group consisting of polyvinylidene fluoride-co-hexafluoro propylene (PVDF-co-HFP), polyvinylidene fluoride-co-trichloro ethylene, polyvinylidene fluoride-co-chlorotrifluoro ethylene, polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethyl cellulose, cyanoethyl sucrose, pullulan, carboxyl methyl cellulose (CMC), acrylonitrile-styrene-butadiene copolymer, polyimide, polyvinylidene-fluoride, polyacrylonitrile and styrene butadiene rubber (SBR), or mixtures thereof.

6. A secondary battery, comprising:
   a cathode;
   an anode; and
   a separator for a secondary battery according to claim 1 interposed between the cathode and the anode.

7. The secondary battery according to claim 6, wherein the secondary battery is a lithium secondary battery.

* * * * *